United States Patent
Rengers et al.

(10) Patent No.: US 11,027,491 B2
(45) Date of Patent: Jun. 8, 2021

(54) POWDER RECIRCULATING ADDITIVE MANUFACTURING APPARATUS AND METHOD

(71) Applicant: General Electric Company, Schenectady, NY (US)

(72) Inventors: Steven Hubert Rengers, Cincinnati, OH (US); Christian Xavier Stevenson, Blanchester, OH (US); Charles Michael Welsh, Victorville, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/031,085

(22) Filed: Sep. 24, 2020

(65) Prior Publication Data

US 2021/0001556 A1   Jan. 7, 2021

Related U.S. Application Data

(62) Division of application No. 14/816,101, filed on Aug. 3, 2015, now Pat. No. 10,814,387.

(51) Int. Cl.
*B29C 64/35* (2017.01)
*B33Y 10/00* (2015.01)
(Continued)

(52) U.S. Cl.
CPC .............. *B29C 64/35* (2017.08); *B22F 10/00* (2021.01); *B29C 64/153* (2017.08);
(Continued)

(58) Field of Classification Search
CPC .......... B29C 64/35; B33Y 10/00; B33Y 30/00
See application file for complete search history.

(56) References Cited

U.S. PATENT DOCUMENTS 8,470,234 B2   6/2013   Clark
8,691,333 B2   4/2014   Godfrey et al.
(Continued)

FOREIGN PATENT DOCUMENTS

CN   1648802       8/2005
CN   201685457   12/2010
(Continued)

OTHER PUBLICATIONS

EPO Office Action from corresponding EP patent application 16181267.2 dated May 27, 2019.
(Continued)

*Primary Examiner* — Joseph S Del Sole
*Assistant Examiner* — Yung-Sheng M Tsui
(74) *Attorney, Agent, or Firm* — Dority & Manning, P.A.

(57) ABSTRACT

A method of making a part by an additive manufacturing process includes the steps of: (a) supporting a build platform on a support surface; (b) traversing a powder dispenser positioned above the support surface across the build platform, while dispensing powder from the powder dispenser, so as to deposit the powder over the build platform; (c) traversing the build platform with a scraper to scrape the deposited powder, so as to form a layer increment of powder; (d) using a directed energy source to fuse the layer increment of powder in a pattern corresponding to a cross-sectional layer of the part; and (e) repeating in a cycle steps (b) through (d) to build up the part in a layer-by-layer fashion.

11 Claims, 5 Drawing Sheets

(51) Int. Cl.
  *B33Y 30/00* (2015.01)
  *B33Y 40/00* (2020.01)
  *B29C 64/153* (2017.01)
  *B29C 64/357* (2017.01)
  *B22F 10/00* (2021.01)
  *B22F 10/10* (2021.01)
  *B29K 105/00* (2006.01)

(52) U.S. Cl.
  CPC ............ *B29C 64/357* (2017.08); *B33Y 10/00* (2014.12); *B33Y 30/00* (2014.12); *B33Y 40/00* (2014.12); *B22F 10/10* (2021.01); *B29K 2105/251* (2013.01); *Y02P 10/20* (2015.11); *Y02P 10/25* (2015.11)

(56) References Cited

U.S. PATENT DOCUMENTS

| | | | |
|---|---|---|---|
| 8,961,167 | B2 | 2/2015 | Swanson et al. |
| 2003/0151167 | A1 | 8/2003 | Kritchman |
| 2005/0280185 | A1* | 12/2005 | Russell ................ B28B 7/465 264/308 |
| 2009/0026175 | A1 | 1/2009 | Adams |
| 2011/0278773 | A1* | 11/2011 | Bokodi ................ B29C 64/153 264/497 |
| 2016/0339639 | A1 | 11/2016 | Chivel |

FOREIGN PATENT DOCUMENTS

| | | | |
|---|---|---|---|
| CN | 102029389 | | 4/2011 |
| CN | 102029389 A | * | 4/2011 |
| DE | 102009029765 | | 12/2010 |
| EP | 2583774 | | 4/2013 |
| JP | 2009508723 | | 3/2009 |
| JP | 2014125643 | | 7/2014 |
| WO | 9534468 | | 12/1995 |
| WO | WO-9534468 A1 | * | 12/1995 ............ B29C 31/04 |
| WO | 2015025171 | | 2/2015 |
| WO | 2015075539 | | 5/2015 |

OTHER PUBLICATIONS

EPO Office Action from corresponding EP patent application 16181267.2 dated Dec. 20, 2019.

Office Action issued in connection with corresponding CA Application No. 2937643 dated Feb. 1, 2018.

Machine Translation and First Office Action and Search issued in connection with corresponding CN Application No. 201610626542 dated Dec. 27, 2017.

Machine Translation and Notification of Reasons for Refusal Issued in connection with corresponding JP Application No. 2016-142910 dated Nov. 21, 2017.

Office Action issues in connection with corresponding CA Application No. 2937643 dated May 11, 2017.

European Search Report and Opinion issued in connection with corresponding EP Application No. 16181267.2 dated Dec. 21, 2016.

* cited by examiner

POWDER RECIRCULATING ADDITIVE MANUFACTURING APPARATUS AND METHOD

BACKGROUND OF THE INVENTION

This invention relates generally to additive manufacturing, and more particularly to a powder recirculating additive manufacturing apparatus and method for producing a component or part.

Additive manufacturing is an alternative process to casting, in which material is built up layer-by-layer to form a component or part. Unlike casting processes, additive manufacturing is limited only by the position resolution of the machine and not limited by requirements for providing draft angles, avoiding overhangs, etc. as required by casting. Additive manufacturing is also referred to by terms such as "layered manufacturing," "reverse machining," "direct metal laser melting" (DMLM), and "3-D printing." Such terms are treated as synonyms for purposes of the present invention.

Currently, powder bed technologies have demonstrated the best resolution capabilities of prior art metal additive manufacturing technologies. However, since the build needs to take place in the powder bed, conventional machines use a large amount of powder, for example a power load can be over 130 kg (300 lbs.). This is costly when considering a factory environment using many machines. The powder that is not directly melted into the part but stored in the neighboring powder bed is problematic because it adds weight to the elevator systems, complicates seals and chamber pressure problems, is detrimental to part retrieval at the end of the part build, and becomes unmanageable in large bed systems currently being considered for large components.

Accordingly, there remains a need for additive manufacturing apparatus and method capable of producing a component without the use of a powder bed.

BRIEF SUMMARY OF THE INVENTION

According to one aspect of the invention, a method of making a part by an additive manufacturing process includes the steps of: (a) supporting a build platform on a support surface; (b) traversing a powder dispenser positioned above the support surface across the build platform, while dispensing powder from the powder dispenser, so as to deposit the powder over the build platform; (c) traversing the build platform with a scraper to scrape the deposited powder, so as to form a layer increment of powder; (d) using a directed energy source to fuse the layer increment of powder in a pattern corresponding to a cross-sectional layer of the part; and (e) repeating in a cycle steps (b) through (d) to build up the part in a layer-by-layer fashion.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
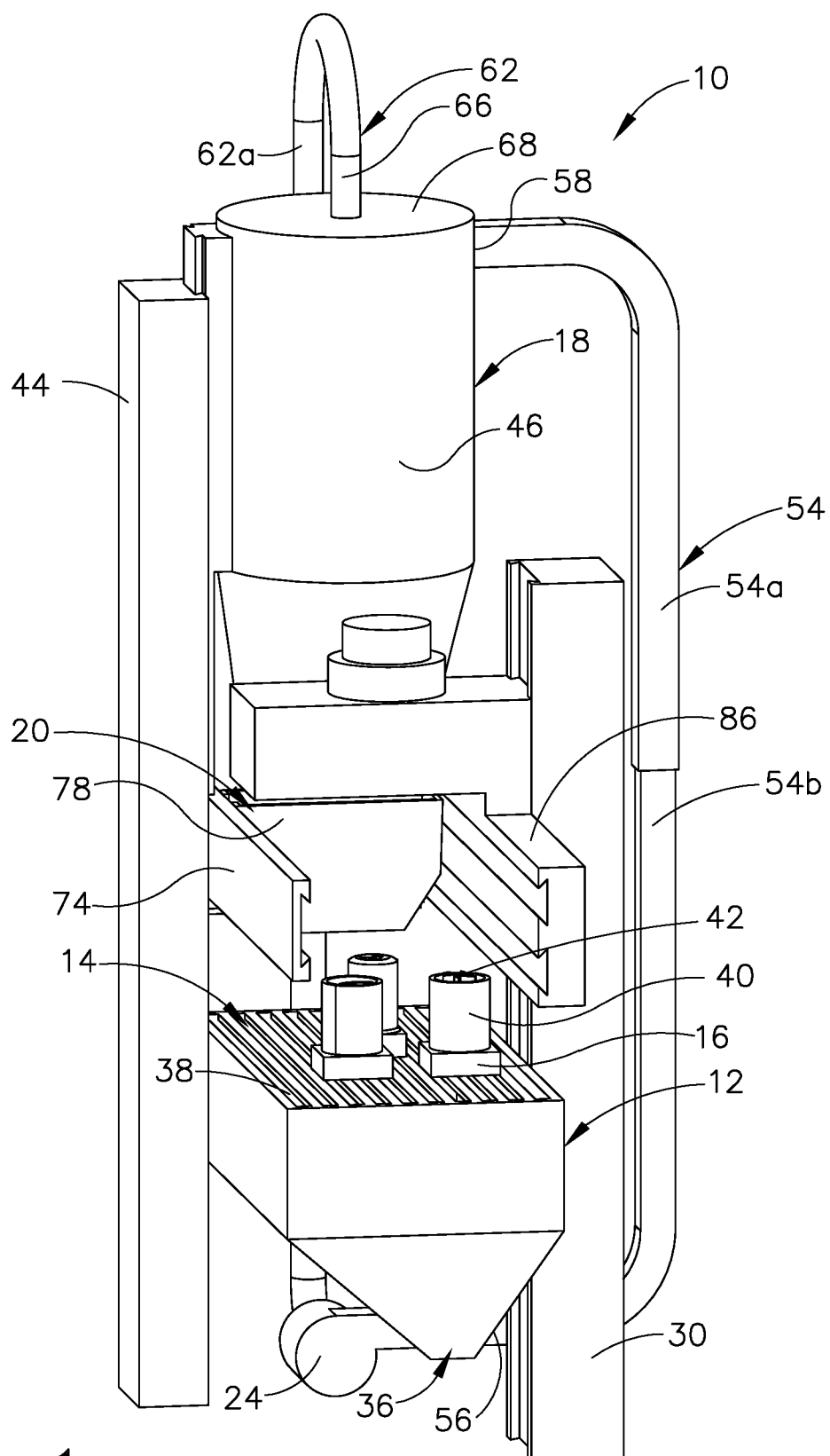
FIG. 1 is a right side elevation of an additive manufacturing apparatus constructed according to an aspect of the invention.
Figure 2:
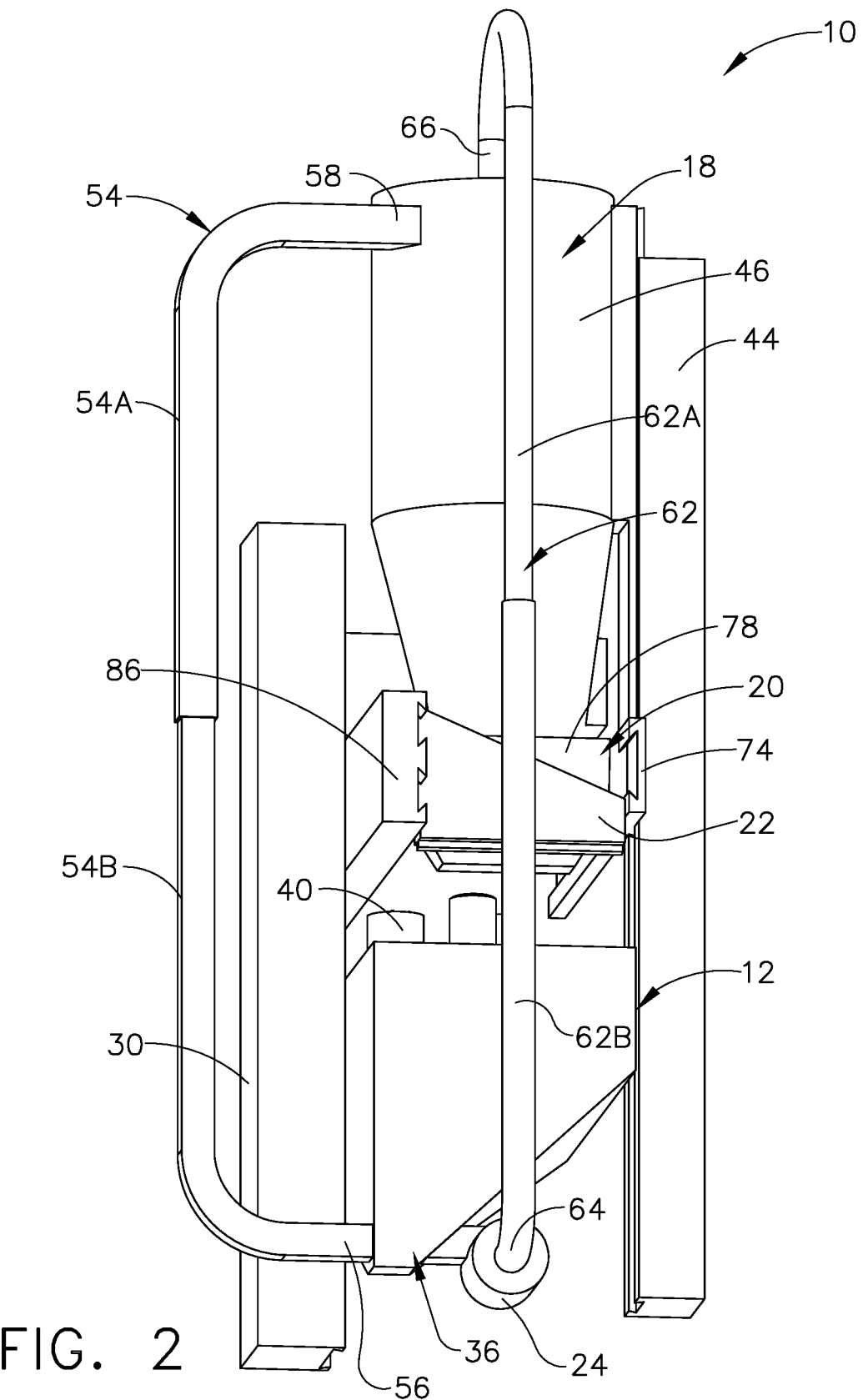
FIG. 2 is a left side elevation of the additive manufacturing apparatus of FIG. 1.
Figure 3:
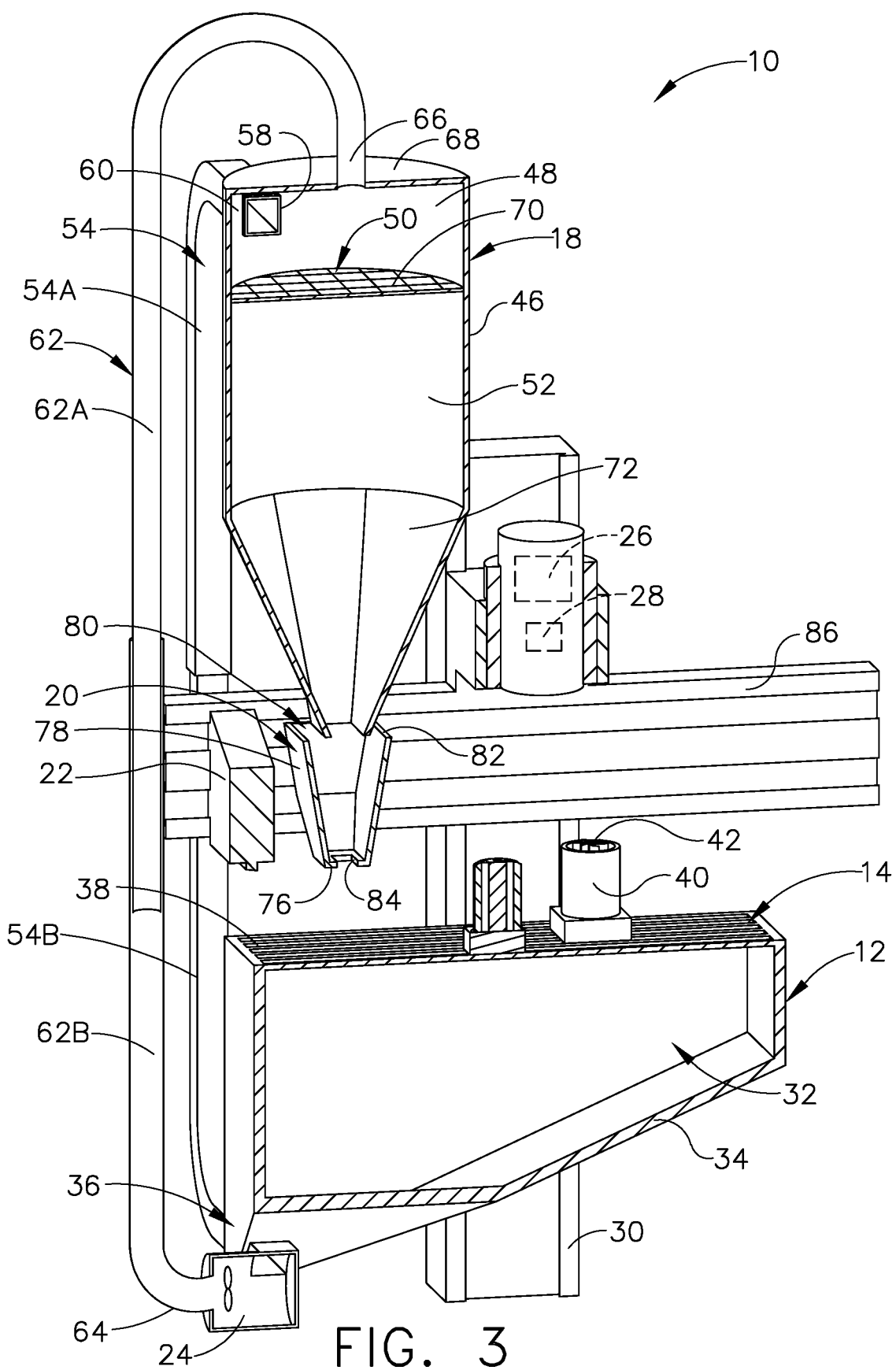
FIG. 3 is a front cross-sectional view of the additive manufacturing apparatus of FIG. 1 in a loading position.
Figure 4:
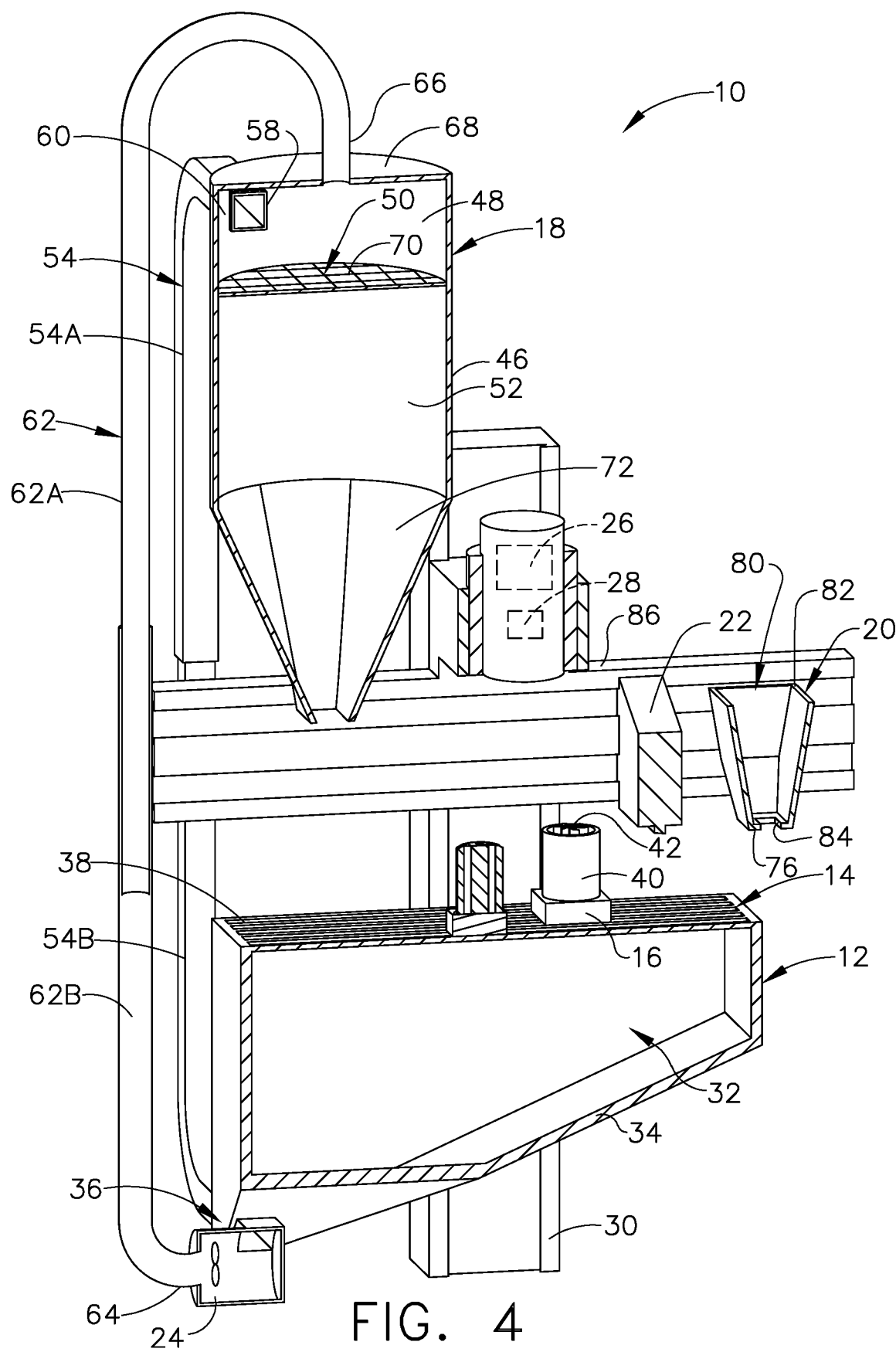
FIG. 4 is a front cross-sectional view of the additive manufacturing apparatus of FIG. 1 in a use position.

Referring to the drawings wherein identical reference numerals denote the same elements throughout the various views, FIGS. 1-4 illustrate an apparatus 10 for carrying out a manufacturing method of the present invention. The basic components are a collection hopper 12 having a support surface 14 configured to support one or more build platforms 16, a powder supply assembly 18 configured to supply powder, a powder dispenser 20 configured to receive powder from the powder supply assembly 18 and drop the powder onto the build platforms 16, a scraper 22 to level the powder dropped onto the build platforms 16, a blower 24 configured to blow powder contained in the collection hopper 12 into the powder supply assembly 18, a directed energy source 26 to melt the leveled powder on the build platforms, and a beam steering apparatus 28. For purposes of this application, the powder may be any powder which can be dispensed in layers and fused by a radiant energy source, for example, metal and plastic powders. Each of these components will be described in more detail below. While not shown, it will be understood that the entire apparatus 10 may be enclosed, in use, in an environment of inert gas or other suitable atmosphere to prevent undesired oxidation and/or contamination, and to provide secondary containment for the powder.

The collection hopper 12 is carried by a first support 30 and includes a collection chamber 32 configured to collect and store unused powder that is dropped from the powder supply assembly 18, powder dispenser 20, and/or any powder that is removed from the build platforms 16 by the scraper 22. The collection chamber 32 includes a sloped bottom wall 34 to promote movement of the collected powder to a low point and/or collection point 36 in the collection chamber 32. The support surface 14 provides a planar work surface for the build platforms 16 to rest. The surface 14 includes a plurality of slots 38 or other openings formed therein to provide a grated surface and permit unused powder to drop through the slots 38 and into the collection chamber 32. The collection hopper 12 may be fixed in place or slidably connected to the first support 30 to permit vertical movement of the collection hopper 12.

The build platforms 16 are plate-like structures that provide a planar build surface configured to receive powder and permit the directed energy source 26 to form a containment wall 40 and a part 42 inside of the containment wall 40 thereon. The platforms 16 may be formed of any material capable of permitting the directed energy source to melt powder thereon and to permit the build platforms 16 to be reused for multiple additive manufacturing processes. For example, the build platform 16 may be formed of a metal or ceramic material. The build platforms 16 are sized to be slightly larger than the containment wall 40 to minimize the amount of powder needed to build a part 42 and to allow any powder not being used to fall into the collection hopper 12.

As shown, the build platforms 16 are positioned on the support surface 14 during a build process.

The powder supply assembly 18 is carried by a second support 44 and slidably connected thereto to permit the powder supply assembly 18 to move vertically. The powder supply assembly 18 includes a supply container 46 having a cyclone chamber 48, a sieve 50, and a storage chamber 52. A powder feed tube 54 is connected between the collection hopper 12 and the powder supply assembly 18. More particularly, a first end 56 of the powder feed tube 54 is connected to the collection point 36 of the collection chamber 32 and a second end 58 of the powder feed tube 54 extends through an annular side wall 60 of the cyclone chamber 48. Additionally, an air return tube 62 is connected between the blower 24 and the powder supply assembly 18. In more detail, a first end 64 of the air return tube 62 is connected to a suction side of the blower 24 and a second end 66 of the air return tube 62 is connected to a top wall 68 of the supply container 46, at a central position. The blower 24 is connected to the collection chamber 32 at collection point 36 to blow powder out of the collection chamber 32 and into the cyclone chamber 48 via powder feed tube 54. It should be appreciated that the blower 24 may be any device suitable to move powder from the collection hopper 12 to the powder supply assembly 18 via powder feed tube 54, such as a fan or pump. Both the powder feed tube 54 and the air return tube 62 may be formed of two telescoping sections 54A, 54B and 62A, 62B or otherwise configured to permit vertical movement of the powder supply assembly 18 and/or collection hopper 12.

The cyclone chamber 48 is generally cylindrical and configured to remove powder from powder entrained air entering the cyclone chamber 48 via powder feed tube 54. As shown, the second end 58 of the powder feed tube 54 is positioned off-center to promote a cyclonic action. In other words, the powder feed tube 54 is positioned such that the powder entrained in air is spun along the cyclone chamber's side wall 60 to remove the powder from the air. The powder is dropped onto sieve 50 and the air is sucked out of the cyclone chamber 48 by the suction side of the blower 24 via the air return tube 62. It is noted that the powder recirculation process, from collection point 36 to blower 24 to powder feed tube 54 to storage chamber 52, and thence to the powder dispenser 20 or the collection chamber 32, may occur either continuously or intermittently.

The sieve 50 includes a plurality of apertures 70 having a pre-determined size suitable to collect debris from the powder while allowing good powder to sift therethrough and into the storage chamber 52. The storage chamber 52 includes a conically-shaped spout 72 configured to dispense powder from the storage chamber 52. It should be appreciated that the spout 72 may have any shape suitable to dispense powder from the storage chamber 52.

The powder dispenser 20 is configured to receive powder via the spout 72 from the powder supply assembly 18 and dispense the powder onto the build platforms 16. The powder dispenser 20 is carried by a first rail 74 to permit the powder dispenser 20 to traverse the support surface 14. Because the powder dispenser 20 traverses the support surface 14, multiple build platforms 16 may be spaced about the support surface 14 to receive powder. The powder dispenser 20 includes a bottom wall 76, a plurality of side walls 78 extending outwardly from the bottom wall 76, and an open top 80 defined by a top edge 82 of the side walls 78. The bottom wall 76 includes an aperture 84 extending therethrough and is sized to drop powder at a pre-determined flow rate from the powder dispenser 20 as it traverses the support surface 14. The open top 80 is sized to receive powder from the spout 72 of the powder supply assembly 18 and the side walls 78 are configured to contain the powder in the powder dispenser 20 and direct the powder towards aperture 84. Optionally, the powder dispenser 20 may also be vibrated using known techniques such as ultrasonic vibration to ensure that the powder flows through the aperture 84 at a specified rate.

The scraper 22 is a rigid, laterally-elongated structure configured to scrape powder disposed on a build platform 16, thereby leveling the powder and removing any excess powder. The scraper 22 is carried by a second rail 86 to permit the scraper 22 to traverse the support surface 14. The second rail 86 is carried by the first support 30 to permit the second rail 86 to permit vertical movement of the second rail 86.

The directed energy source 26 is carried by the second rail 86 and may be raised or lowered with respect to the support surface 14 by moving the second rail along the first support 30. The directed energy source 26 may comprise any known radiant energy source of suitable power and other operating characteristics to melt and fuse the powder during the build process, described in more detail below. For example, a laser source having an output power density having an order of magnitude of about $10^4$ W/cm$^2$ may be used. Other directed-energy sources such as electron beam guns are suitable alternatives to a laser source.

The beam steering apparatus 28 comprises one or more mirrors, prisms, and/or lenses and is provided with suitable actuators, and arranged so that a beam "B" from the directed energy source 26 (see FIG. 6) can be focused to a desired spot size and steered to a desired position in an X-Y plane coincident with the support surface 14.

Actuators (not shown) may be used to move the components of the apparatus 10. More particularly, actuators may be used to selectively move the second rail 86 and/or the collection hopper 12 along the first support 30, the powder supply assembly 18 along the second support 44, the powder dispenser 20 along first rail 74, and the scraper 22 along second rail 86. Actuators such as pneumatic or hydraulic cylinders, ballscrew or linear electric actuators, and so forth, may be used for this purpose. Additionally, the components may be keyed to the supports or rails to which they are carried by to provide a stable connection that allows the components to move. As illustrated, a dovetail-type connection is used; however, it should be appreciated that any suitable type of connection that is stable and allows a component to move relative to the support and/or rail may be used.

Figure 5:
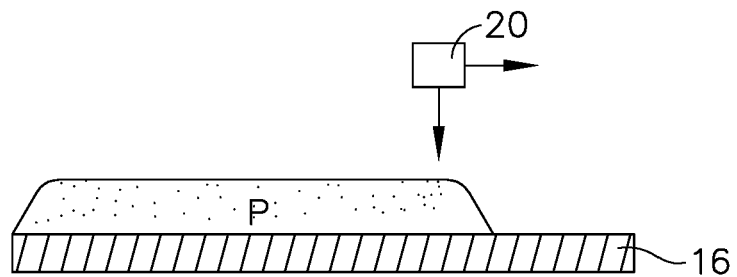
FIG. 5 illustrates powder being dispensed on a support platform.

The build process using the apparatus 10 described above is as follows. The powder dispenser 20 and scraper 22 are moved to an initial position, shown in FIG. 3, to allow a build platform 16 to be secured to support surface 14. As shown, the powder dispenser 20 and scraper 22 are moved along the first and second rails 74, 86 to permit the powder dispenser 20 to receive powder "P" (FIG. 5) from the powder supply assembly 18 by aligning spout 72 with open top 80 of the powder dispenser 20. Additionally, the first and second rails 74, 86 are moved along first and second supports 30 and 44 to position the powder dispenser 20 and scraper 22 at substantially the same elevation to prevent the powder dispenser 20 from interfering with the directed energy source 26 while traversing the support surface 14. The initial position also places the directed energy source 26 at a suitable elevation to melt a first layer of powder P disposed on the build platform 16, FIG. 7.

The powder supply assembly 18 fills the powder dispenser 20 with powder P via the spout 72. Once filled, the powder dispenser 20 drops a continuous flow of powder P at a controlled rate through the aperture 84. Subsequent to filling, the powder dispenser 20 may traverse the support surface 14 and build platforms 16, from the initial position to an end position, FIG. 4, while dropping a flow of powder P Powder P dropped on the support surface 14 falls through the slots 38 for recycling while powder P dropped onto the build platform 16 forms a first layer of powder P.

Figure 6:
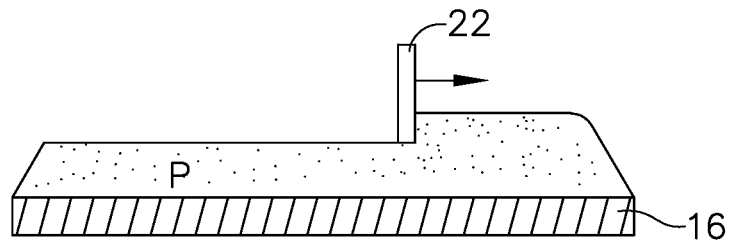
FIG. 6 illustrates powder being scraped or leveled.

The scraper 22 then traverses the support surface 14 and build platform 16 to spread the first layer of powder P horizontally across the build platform 16, thereby leveling the powder P to form a first layer increment of powder P, FIG. 6. The layer increment affects the speed of the additive manufacturing process and the resolution of the part 42. As an example, the layer increment may be about 10 to 50 micrometers (0.0003 to 0.002 in.). Any excess powder P drops through the slots 38 and into the collection chamber 32 for recycling as the scraper 22 passes from left to right. Subsequently, the scraper 22 and powder dispenser 20 may be retracted back to the initial position where the powder dispenser 20 may be refilled with powder P. The return traverse may be delayed until after the laser melting step described below. As described above, excess powder P that falls into collection chamber 32 is blown by blower 24 back into powder supply assembly 18.

Figure 7:
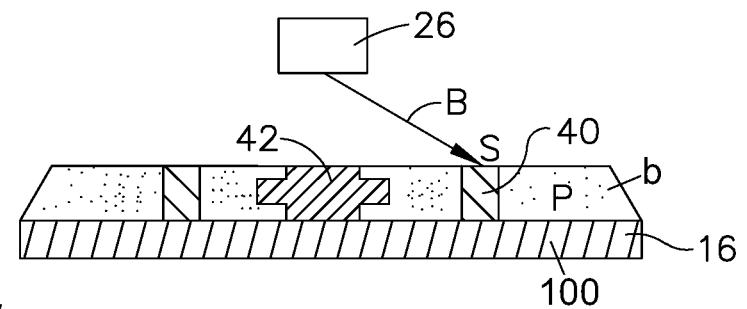
FIG. 7 illustrates the leveled powder of FIG. 6 being fused by a laser to form a containment wall and component.

The directed energy source 26 is used to melt a two-dimensional cross-section of the containment wall 40 and part 42 being built, FIG. 7. As noted above, the containment wall 40 is built on the build platform 16 along with the part 42. The directed energy source 26 emits a beam "B" and the beam steering apparatus 28 is used to steer the focal spot "S" of the beam B over the exposed powder surface in an appropriate pattern. The exposed layer of the powder P is heated by the beam B to a temperature allowing it to melt, flow, and consolidate.

The powder supply assembly 18 and powder dispenser 20 may be moved vertically upward along second support 44 at a distance substantially equal to the first layer increment to position the powder dispenser 20 for spreading a second layer of powder P of similar thickness to the first layer. The second rail 86 also moves vertically upward along first support 30 at a distance substantially equal to the first layer increment to position the scraper 22 for spreading the second layer of powder P and to position the directed energy source 26 for melting the exposed second layer of powder P. Optionally, the collection hopper 12 may be moved vertically downward along the first support 30 at a distance substantially equal to the first layer increment, or a combination of upward and downward vertical movement (downward for the collection hopper 12 and upward for the powder supply assembly 18, powder dispenser 20, scraper 22, and directed energy source 26) of the components may be performed to increase the distance between the collection hopper 12 and the powder supply assembly 18, powder dispenser 20, scraper 22, and directed energy source 26 by a distance substantially equal to the first layer increment.

Once in position, the powder dispenser 20 traverses the support surface 14 and build structure 16 from the initial position to the end position and applies the second layer of powder P. The scraper 22 then traverses the support surface 14 and build platform 16 to spread the applied second layer of powder P at a similar thickness to that of the first layer increment. Alternatively, depending on the capacity of the powder dispenser 20 and the flow rate from the aperture 84, a second application of powder P may be applied as the powder dispenser 20 traverses back from the end position to the end position (without having had to execute a return trip to re-fill). The directed energy source 26 again emits a beam B and the beam steering apparatus 28 is used to steer the focal spot S of the beam B over the exposed powder surface in an appropriate pattern. The exposed layer of powder P is heated to a temperature allowing it to melt, flow, and consolidate both within the top layer and with the lower, previously-solidified layer.

This cycle of moving the components, applying powder P, and the directed energy source melting the powder P is repeated until the entire part 42 is complete. The containment wall 40 is built up along with the part 42.

Figure 8:
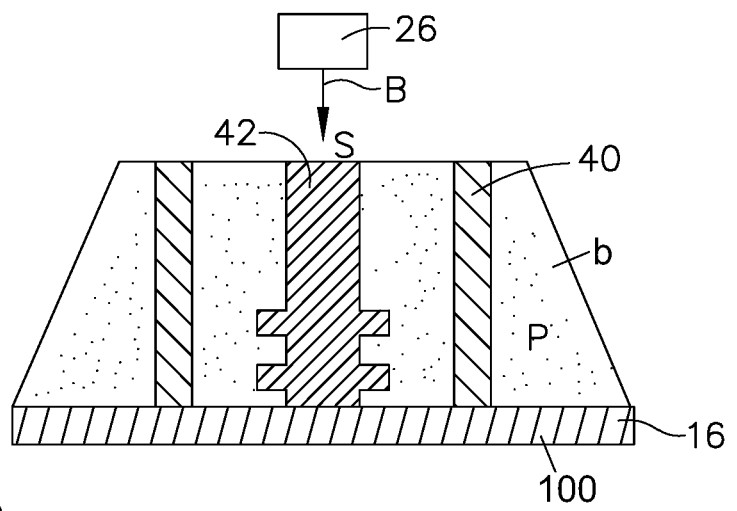
FIG. 8 illustrates a containment wall and component built up after multiple passes of the process illustrated in FIGS. 5-7.

As seen in FIGS. 7 and 8, the build platform 16 may be made wider than the overall width of the containment wall 40, creating a lateral overhang 100. This overhang 100 permits powder P to build up on the build platform 16 around the exterior of the containment wall 40 during the build process. This powder P, lacking exterior support, tends to slope off at the natural angle of repose of the powder P. The remaining powder P defines a buttress "b" which provides exterior lateral support for the containment wall 40, so that its integrity and wall thickness can be maintained during the build (i.e. the wall thickness can be uniform as the containment wall 40 extends upwards). The lateral width of the overhang 100 may be selected, knowing the angle of repose of the specific powder P, so that a minimum width "W" of powder P remains to support the containment wall 40, even at the maximum height "H" of the part 42 and containment wall 40.

The apparatus and process described above provide a means for additive manufacturing of parts without the need for fixed powder containers and the associated excess powder requirements. This will save time and money in the build process, reduce the size and complexity of fixed equipment, and increase the flexibility of the build process.

The foregoing has described a powder recirculating additive manufacturing apparatus and method. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A method of making a part by an additive manufacturing process, comprising the steps of:
    (a) supporting a solid build platform on top of a support surface that includes openings extending therethrough;
    (b) traversing a powder dispenser positioned above the support surface across the build platform, while dispensing powder from the powder dispenser, so as to deposit the powder over the build platform, wherein some of the powder dispensed falls through the openings in the support surface and into a collection hopper;
    (c) traversing the build platform with a scraper to scrape the deposited powder, so as to form a layer increment of powder, wherein excess powder is scraped from the solid build platform and through the openings in the support surface and into the collection hopper;

(d) using a directed energy source to fuse the layer increment of powder in a pattern corresponding to a cross-sectional layer of the part; and (e) repeating in a cycle steps (b) through (d) to build up the part in a layer-by-layer fashion.

2. The method of claim 1 further comprising, prior to step (b):

moving the powder dispenser to a first position underneath a powder supply assembly that is disposed above the support surface; and dropping powder from the powder supply assembly into the powder dispenser.

3. The method of claim 1 further including using a blower coupled to the collection hopper to move powder collected in the collection hopper to the powder supply assembly for reuse.

4. The method of claim 3 wherein:

a powder feed tube interconnects the powder supply assembly and the blower;

an air return tube interconnects the powder supply assembly and the blower; and the blower recirculates powder in a loop from the collection hopper, through the powder feed tube, and into the powder supply assembly.

5. The method of claim 4 wherein the powder feed tube and the air return tube each comprise a pair of telescoping sections.

6. The method of claim 4 wherein:

the powder supply assembly includes a cyclone chamber with an annular side wall connected to a top wall;

the powder feed tube enters the side wall at an off-center position; and the air return tube enters the top wall at a central position.

7. The method of claim 1 further comprising, during steps (b)-(d), building up a containment wall on the build platform, the containment wall surrounding the part.

8. The method of claim 7 wherein the build platform is wider than an exterior width of the containment wall so as to define an overhang, the method further comprising, during steps (b)-(d), permitting an excess of powder to build up on the overhang so as to form a buttress which supports the containment wall.

9. The method of claim 8 wherein a width of the overhang is selected to permit the buttress to maintain a preselected minimum width when the part and containment wall are at a maximum predetermined height.

10. The method of claim 2 wherein the powder supply assembly is moveable vertically relative to the support surface.

11. A method of making a part by an additive manufacturing process, comprising the steps of:

(a) supporting a solid build platform on a grated support surface;

(b) traversing a powder dispenser positioned above the grated support surface across the solid build platform, while dispensing powder from the powder dispenser, so as to deposit the powder over the solid build platform;

(c) traversing the solid build platform with a scraper to scrape the deposited powder, so as to form a layer increment of powder;

(d) collecting unused powder from steps (b) and (c) in a hopper for recycling the unused powder in the powder dispenser;

(e) using a directed energy source to fuse the layer increment of powder in a pattern corresponding to a cross-sectional layer of the part; and (f) repeating in a cycle steps (b) through (e) to build up the part in a layer-by-layer fashion.

* * * * *